(12) United States Patent
Hannington et al.

(10) Patent No.: US 6,350,036 B1
(45) Date of Patent: Feb. 26, 2002

(54) RETROREFLECTIVE SHEETING CONTAINING A VALIDATION IMAGE AND METHODS OF MAKING THE SAME

(75) Inventors: Michael Hannington, Madison; Bruce Newell, Painesville, both of OH (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 09/431,558

(22) Filed: Oct. 29, 1999

Related U.S. Application Data

(60) Provisional application No. 60/106,359, filed on Oct. 30, 1998.

(51) Int. Cl.$^7$ .............................................. G02B 5/128
(52) U.S. Cl. ..................... 359/541; 359/534; 359/536; 359/538; 359/540
(58) Field of Search ................................ 359/534–542, 359/513, 514

(56) References Cited

U.S. PATENT DOCUMENTS

| | | | |
|---|---|---|---|
| 4,505,967 A | 3/1985 | Bailey | 428/164 |
| 4,645,301 A | 2/1987 | Orensteen et al. | |
| 4,650,283 A | 3/1987 | Orensteen et al. | |
| 4,664,966 A | 5/1987 | Bailey et al. | 428/203 |
| 4,688,894 A | 8/1987 | Hockert | |
| 4,691,993 A | 9/1987 | Porter et al. | |
| 4,725,494 A | 2/1988 | Belisle et al. | 428/325 |
| 5,510,171 A | 4/1996 | Faykish | 428/195 |
| 5,620,775 A * | 4/1997 | LaPerre | 359/536 |
| 5,726,803 A * | 3/1998 | Ochi et al. | 359/536 |
| 5,882,771 A * | 3/1999 | Klein et al | 359/541 |

* cited by examiner

*Primary Examiner*—James Phan
(74) *Attorney, Agent, or Firm*—Renner, Otto, Boisselle & Sklar, LLP

(57) ABSTRACT

This invention relates to retroreflective sheeting which has an image, such as an image. More specifically, the image has varying appearance at different angles of view. The retroreflective sheeting has a layer of transparent microsphere lenses, a transparent polymeric spacing layer underlying, contacting, and conforming to the bottom of the lenses, the spacing and conformation of which is critical to the optimal performance of the retroreflective article, a reflective layer having a top surface in contact with the back surface of the spacing layer and a topcoat and/or cover sheet overlying and conforming to the top surfaces of the lenses and having a flat top surface or face. In another embodiment, the retroreflective sheeting includes a pressure sensitive adhesive underlying and in contact with the reflective layer. The retroreflective sheeting has an image whose proportions are determined by a nonconformity of the reflective and spacing layer to the bottom of the lenses. The image of the present invention can range from conspicuous to inconspicuous and directional to non-directional.

19 Claims, 7 Drawing Sheets

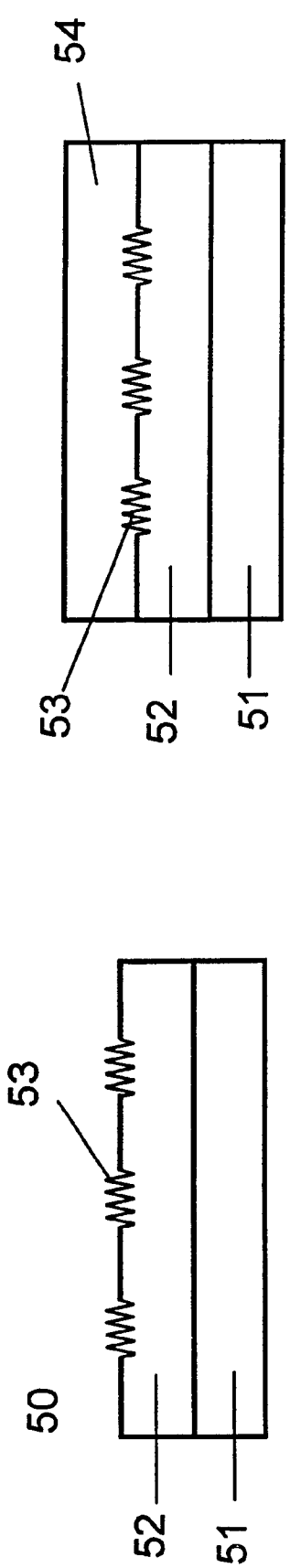
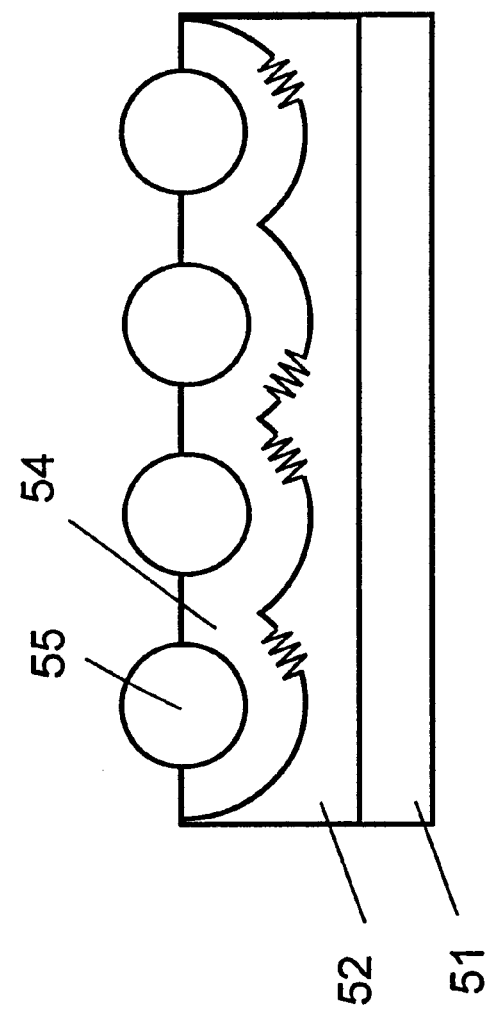

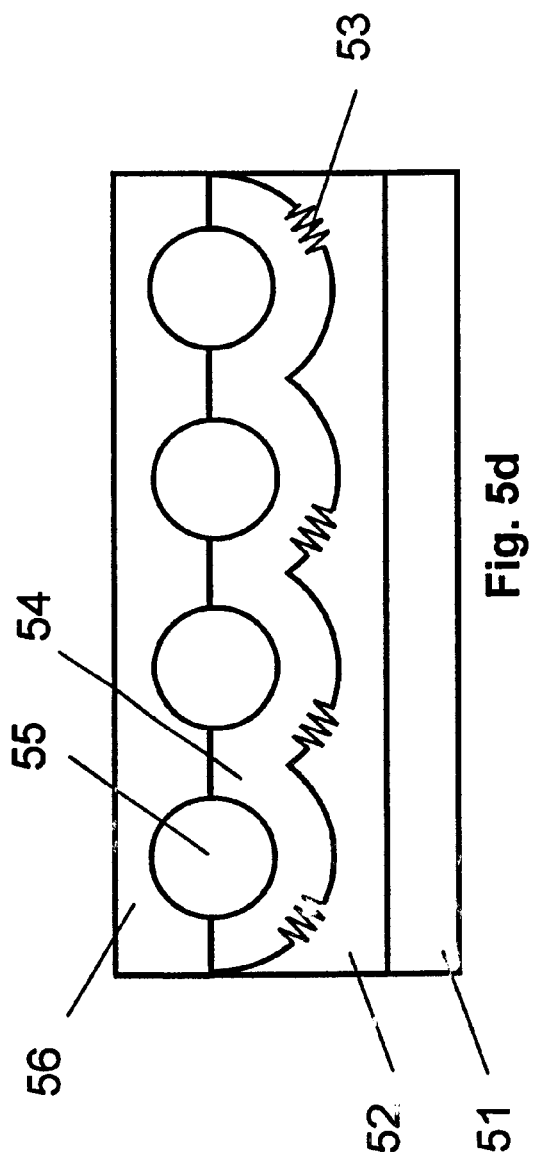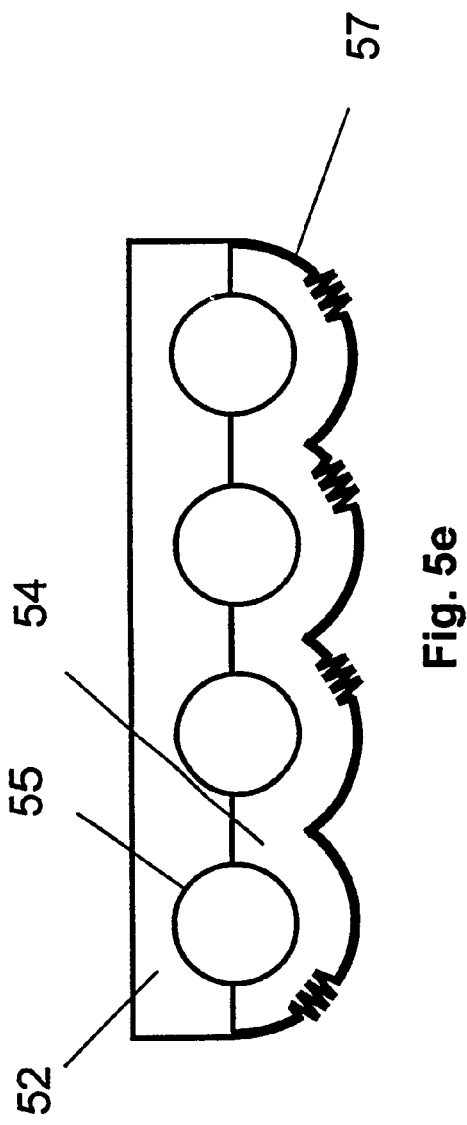

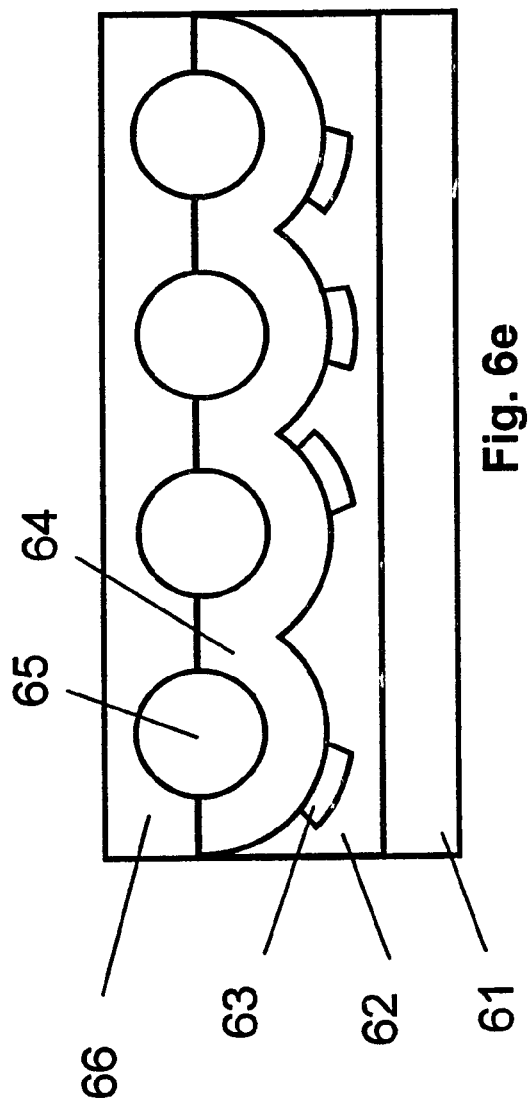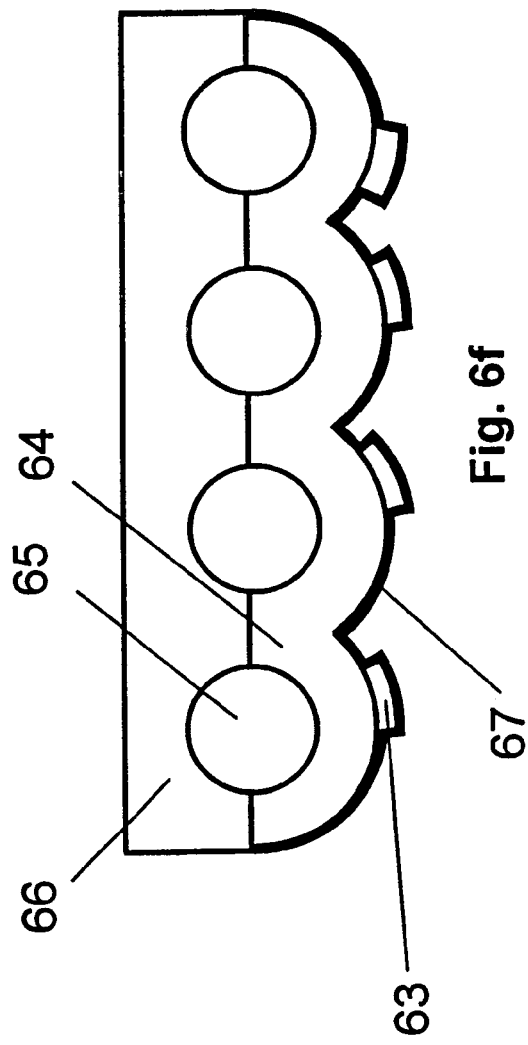

RETROREFLECTIVE SHEETING CONTAINING A VALIDATION IMAGE AND METHODS OF MAKING THE SAME

CROSS REFERENCE TO PROVISIONAL APPLICATION

This application claims priority from provisional application Ser. No. 60/106,359, filed Oct. 30, 1998, the entire disclosure of which is hereby incorporated by reference.

FIELD OF THE INVENTION

The present invention relates to a retroreflective sheeting with an image, more specifically a validation image.

BACKGROUND OF THE INVENTION

Validation images have been used for years for authentication and security purposes. A watermark is an identifying pattern or legend either on or in a material to provide validation of the material. Retroreflective sheeting with directional and non-directional watermarks have been used as a validation means for documents, phonographs, cassette tapes, compact disk containers, traffic signage and license plates.

One problem with watermarks on retroreflective material is providing the watermark in a manner which provides the needed authentication but which provides some subtlety or inconspicuousness, such as being discernible in only a few angles of viewing. Often expensive processing steps and equipment are required to provide such a watermark. Additionally, there is generally little processing control over the conspicuousness or intensity of the watermark.

It is desirable to have an image which is distinct and viewable for authenticating purposes. Further, it is desirable to have a processing means to provide the desired intensity of the image. Finally, it is also desirable to have an image which may be subtle and directional.

SUMMARY OF THE INVENTION

This invention relates to retroreflective sheeting which has an image, such as a validation image. In one embodiment, the image is directional having varying appearance at different angles of view. The retroreflective sheeting has a layer of transparent microsphere lenses, a transparent polymeric spacing layer underlying, contacting, and conforming to the bottom of the lenses, the spacing and conformation of which is critical to the optimal performance of the retroreflective article, a reflective layer having a top surface in contact with the back surface of the spacing layer and a topcoat and/or cover sheet overlying and conforming to the top surfaces of the lenses and having a flat top surface or face. In another embodiment, the retroreflective sheeting includes a pressure sensitive or thermally activated adhesive underlying and in contact with the reflective layer. The retroreflective sheeting has an image whose proportions are determined by a nonconformity of the reflective and spacing layer to the bottom of the lenses. The image of the present invention can range from conspicuous to inconspicuous and directional to non-directional.

BRIEF DESCRIPTION OF THE DRAWINGS

FIG. 5 is an illustration of an alternative method of imparting the image.

DESCRIPTION OF THE PREFERRED EMBODIMENTS

Figure 1:
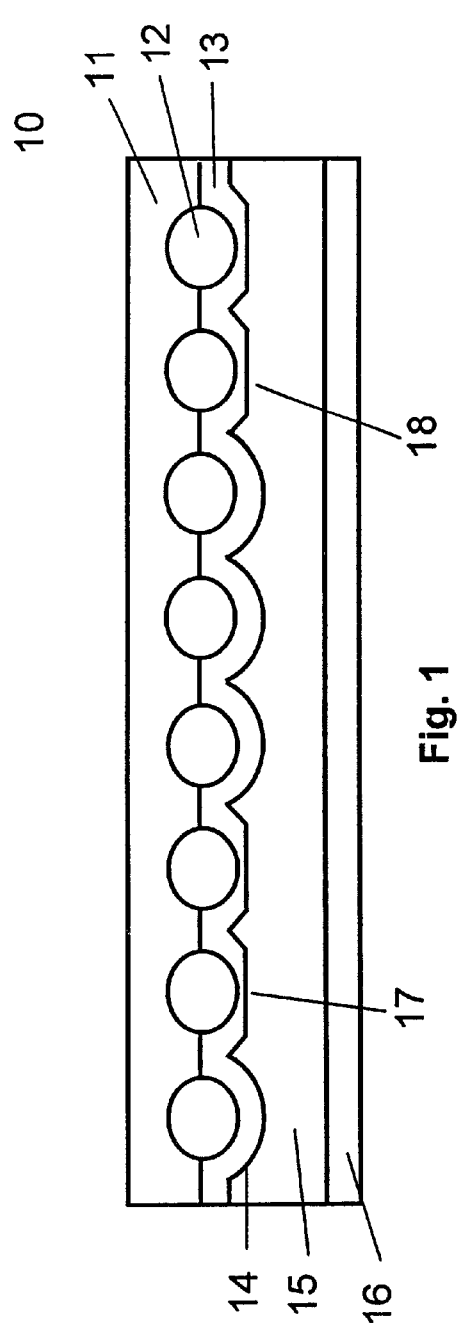
FIG. 1 is a cross sectional view of a retroreflective sheeting.

As described herein, the invention relates to a retroreflective sheeting which has an image. The image is a portion of the reflective layer which does not conform, or is less conforming to the back surface of the microsphere lenses. The portion of the reflective layer, which is out of conformity, does not provide the same magnitude of retroreflectivity as the conforming areas. This non-conforming area can range from a "dead" or nonreflecting, to a less reflecting portion, to a greater reflecting portion of the retroreflective sheeting. This difference in reflective characteristic leads to the image's viewability. The apparent intensity of the image is related to the degree of non-conformity of the spacing and/or the reflective layers.

As described above the retroreflective sheeting has a layer of transparent microsphere lenses. The microsphere lenses may have any refractive index or average diameter provided that the beads provide the necessary refraction for the retroreflective application. Typically the microsphere lenses are characterized as having an average refractive index in the range of about 1.8 to about 2.5, or from about 1.9 to about 2.4, or from about 2.1 to about 2.3 and an average diameter of about 35 to about 100, or from about 45 to about 90, or from about 55 to about 80 microns. Here and elsewhere in the specification and claims the range and ratio limits may be combined. The transparent microsphere lenses utilized in the retroreflective sheeting of the present invention may be characterized as having average diameters in a range of from about 25 to about 300, 30 to about 120 microns, and more often in a range from about 40 to about 80 microns. The index of refraction of the microsphere lenses is generally in the range from about 1.9 to about 2.5, more typically is in the range from about 2.0 to about 2.3, and most often between about 2.10 to about 2.2.

Glass microspheres are typically used although ceramic microspheres such as those made by sol/gel techniques can also be used. The index of refraction and the average diameter of the microspheres, and the index of refraction of the topcoat and/or cover sheet and space coat dictate the thickness of the spacing film. The microspheres can be subjected to chemical or physical treatments to improve the bond of the microspheres to the polymeric films. For example, the microspheres can be treated with a fluorocarbon or an adhesion promoting agent such as an aminosilane to improve the bond, or the space coat layer in which the lenses have been embedded can be subjected to a flame treatment or corona discharge to improve the bond between the space coat and lenses to the subsequently applied topcoat and or cover sheet.

The retroreflective sheeting also has a spacing layer generally conforming to the bottom surface of the microsphere lenses. The thickness of the polymeric spacing layer or space coat is from about 25% to about 100%, or from 40% to about 60% of the average diameter of the microsphere lenses. Various thermoplastic polymeric resins have been used previously in forming the spacing layer of embedded lens retroreflective sheeting, and such resins can be used in the sheeting of the present invention. The resins that may be used for the spacing layer include a variety of partially amorphous or semi-crystalline thermoplastic polymers which generally have a soft stage during which the lenses can be embedded in the films. The material used to form the spacing film or layer should be compatible with the topcoat material and adapted to form a good bond with the topcoat (and the microsphere lenses). Preferably, the adhesion between the materials is greater than the tensile strength of the materials. Acrylics, polyvinyl butyrals, aliphatic urethanes and polyesters are particularly useful polymer materials because of their outdoor stability. Copolymers of ethylene and an acrylic acid or methacrylic acid; vinyls, fluoropolymers, polyethylenes, cellulose acetate butyrate, polycarbonates and polyacrylates are other examples of polymers that can be used for the topcoat and spacing layers of the sheeting of the invention. In one embodiment it is desirable to use materials having elastomeric properties to provide retroreflective sheeting which may be repeatedly stretched or flexed, and upon release of the stretching or flexing tension, rapidly return to substantially their original dimensions without significant loss of retroreflectivity. Polyurethanes are available which possess such elastomeric properties and these materials can be used as space coat materials.

In another embodiment it is desirable to use two or more layers to form a topcoat/cover sheet layer. These may consist of any of the aforementioned materials in combination with a transparent pressure sensitive adhesive (such as AS352RX acrylic adhesive from Avery Chemical in Mill Hall Pa.) underlying the cover sheet and in intimate contact and conforming to the microspheres. The cover sheet or pressure sensitive adhesive can be colored with a transparent pigment or dye or even be printed with a graphic which can be located on the interior or the exterior of the cover sheet. In yet another embodiment the pressure sensitive adhesive can be replaced by a thermal bonding layer, a heat activated adhesive, or a material which forms chemical bonds to the cover sheet.

The retroreflective sheeting has a topcoat or cover sheet overlying and conforming to the top surface of the microsphere lenses. The coating weight of the topcoat may range from about 25 to 175 gms/m². Preferably the coating weight is about 50 to 150 gms/m² and more preferably is from about 60 to 120 gms/m². The topcoat thickness may range from 25 to about 125 microns and more often is from about 50–100 microns.

The cover may comprise various thermoplastic polymers including acrylic polymer such as polymethylmethacrylate, vinyl polymers such as PVC and vinyl acrylic copolymers, or polyurethanes such as aliphatic polyether urethanes. Cover sheets include an impact modified polymethylmethacrylate (PMMA) (e.g., Plexiglas™ acrylic DR, MI-7 (Rohm & Haas), Perspex™ acrylic HI-7 (ICI), or blends thereof), a vinyl acrylic formulation (methyl methacrylate/butyl methacrylate) copolymer and a PVC homopolymer) or a polyurethane. The aliphatic polyurethane cover sheet is produced by casting the urethane onto a polymer coated paper casting sheet or onto a polymer casting sheet. Casting sheet products are well known to the industry and supplied by companies such as Felix Schoeller Technical Papers, Pulaski, N.Y., S. D. Warren of Newton Center, Massachusetts and Ivex Corporation of Troy, Ohio. The urethane coating is coated onto the casting sheet by standard coating methods such as curtain coating, slot die coating, reverse roll coating, knife over roll coating, air knife coating, gravure coating, reverse gravure coating, offset gravure coating, Meyer rod coating, etc. To achieve proper performance and coat weight thickness in each of the coating operations, technical expertise is applied to determine the optimal urethane solution viscosity. The application of these coating techniques is well known in the industry and can effectively be implemented by one skilled in the art. The knowledge and expertise of the manufacturing facility applying the coating determine the preferred method. Further information on coating methods can be found in "Modem Coating and Drying Technology", by Edward Cohen and Edgar Gutoff, VCH Publishers, Inc., 1992. Extrusion or extrusion coating are alternate methods of forming a urethane film.

The retroreflective sheeting may also include a pressure sensitive adhesive and optionally a release liner. For example, an adhesive layer can be applied over the reflective layer to protect the reflective layer and to serve a functional purpose such as adhering the sheeting to a substrate. Conventional pressure-sensitive adhesives such as acrylic-based adhesives, or heat- or solvent-activated adhesives are typically used and may be applied by conventional procedures. For example, a preformed layer of adhesive on a carrier web or release liner can be laminated to the reflective layer. Conventional release liners can be utilized in the formation of the retroreflective sheeting of the present invention.

The retroreflective sheeting is further illustrated in reference to the drawings. In FIG. 1, retroreflective sheeting 10 has a cover sheet, e.g. a polyurethane 11, in which are embedded glass microspheres 12. The glass microspheres are also adhered to spacecoat, e.g. polyvinylbutyral, 13. Reflecting surface (vapor deposited aluminum) 14 is attached to spacecoat 13. A pressure sensitive adhesive 15 and release liner 16 are adhered to reflecting surface 14. Images 17 and 18 are portions of the reflective and spacecoat layers which are non-conforming to the glass beads 12.

Figure 2:
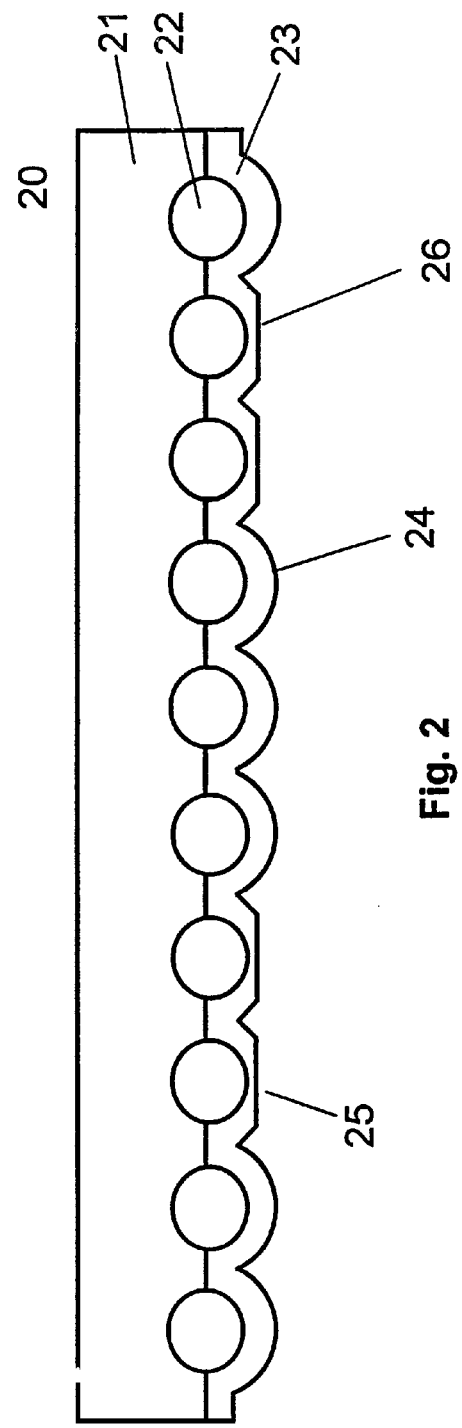
FIG. 2 is a cross sectional view of a retroreflective sheeting.

FIG. 2 illustrates a retroreflective sheeting which does not have a pressure sensitive adhesive. Retroreflective sheeting 20 has cover sheet 21 attached to glass microspheres 22, which are also attached to spacecoat 23. A reflecting surface 24 is on spacecoat 23. Images 25 and 26 are non-conforming sections of the reflective and spacecoat layers 23 and 24.

Figure 3:
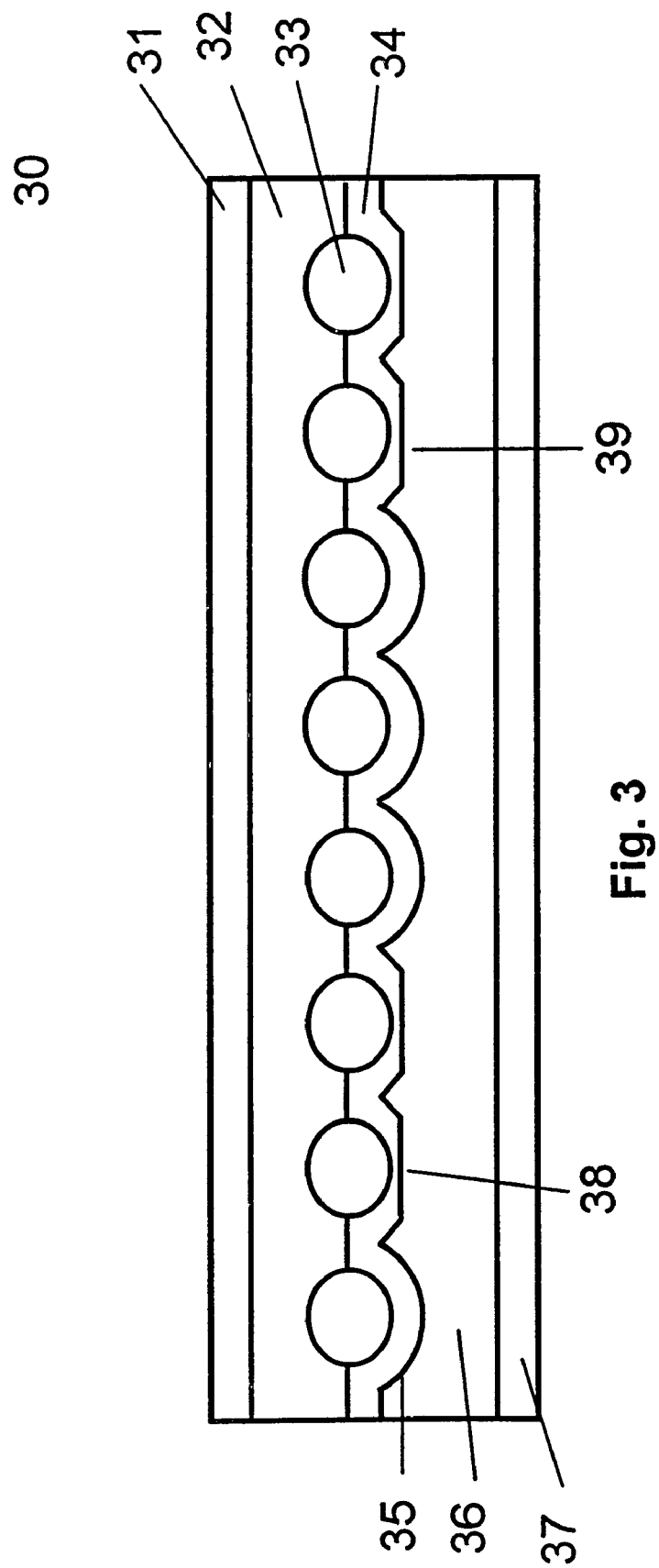
FIG. 3 is a cross sectional view of a retroreflective sheeting.

FIG. 3 illustrates a retroreflective sheeting which has a multilayer covering. Retroreflective sheet 30 which has cover sheet 31 which is adhered to pressure sensitive adhesive 32. Adhesive 32 is bonded to glass microspheres 33, which are also attached to spacecoat 34. A reflecting surface 35 is on spacecoat 34. The reflecting surface 35 is adhered to pressure sensitive adhesive 36 which is also releasably adhered to release liner 37. The retroreflective sheeting has images 38 and 39.

The images of the present invention may be prepared by using embossing or flexographic printing techniques. The images may be prepared by pressing a pattern into the retroreflective sheeting at the pressure and temperature necessary to provide the desired image.

The retroreflective sheeting can be made by procedures normally used in the industry. For example, the sheeting of the invention can be prepared by first extruding or casting a space coat layer of desired thickness on a polymer coated casting sheet and drying if necessary. The space coat layer is reheated to provide a tacky surface upon which microspheres are cascade-coated to form a monolayer of the microspheres. Typically, heat and/or pressure can be applied at this stage to facilitate microsphere embedding. The microspheres generally are embedded into the layer to a depth of about one-half of the average diameter of the microspheres.

It is important that the space coat adapts a contour parallel to the microsphere surface. The topcoat is then applied over the top of the exposed and partially embedded microspheres.

The topcoating is applied by standard coating methods such as those described above. It is also possible to cast the topcoat as a separate, single layer film using these coating techniques. To achieve proper performance and coat weight thickness in each of the coating operations, technical expertise must be applied to determine the optimal solution viscosity. The application of these coating techniques is well known and is described above. Extrusion or extrusion coating are alternate methods of forming a topcoat. If required, the topcoat and the base coat layer are then subjected to an elevated temperature to dry or cure.

The polymer coated casting sheet then is stripped from the space coat layer, and a reflective layer is subsequently applied over the back surface of the space coat. For example, a reflective layer of silver or aluminum metal can be applied by vapor deposition over the back surface of the space coat. The thickness of the reflective layer depends on the particular metal used and is generally between about 500 and 1000 nanometers. The topcoat layer then can be printed (e.g. with UV radiation curable inks) to provide monocolor or multicolor images with the optional transparent overcoat.

An alternate manufacturing process for enclosed bead-type retroreflective products can be used by first applying a polyurethane mixture onto a casting sheet and exposing the newly cast film to heat for solvent evaporation and urethane curing. After the film is formed, a bead bonding layer is applied and typically exposed to elevated temperatures for curing and/or evaporation of a carrier vehicle, such as solvent. Though many materials may be used for the bead bond layer, a thermoplastic polymer is preferred. The bead bond layer can then be partially cured or re-softened by the application of heat to allow cascade coated microspheres to form a monolayer of microspheres. The microspheres generally are embedded into the bead bond layer in a process that uses the application of heat and/or pressure. The space coat layer of desired thickness is then applied over the exposed microspheres. Next, the space coat and base coat layers are subjected to elevated temperatures to complete solvent drying and/or curing and to provide adequate conformation of the spacecoat to the microsphere surface.

As described above, a reflective layer is subsequently applied over the back surface of the space coat layer. After the original casting sheet is stripped from the product, the top aliphatic polyurethane layer can be printed (e.g. with UV radiation curable inks) to provide monocolor or multicolor images with the optional transparent overcoat or overlaminate film.

In another embodiment, the retroreflective sheeting described in a previous paragraph is provided with a pressure-sensitive adhesive construction. In this embodiment, a pressure-sensitive adhesive is coated onto a release coated liner (paper or polymer) thereafter the adhesive coated liner is pressure laminated to the exposed surface of the reflective layer. This embodiment is illustrated in FIG. 1. The release coated liner can subsequently be removed and the retroreflective sheeting can be adhesively applied to other surfaces.

The validation image has at least one portion which is non-conforming to the lenses. In one embodiment, the image is prepared by pressing the image design into the reflective surface of the retroreflective sheeting. The reflective layer of retroreflective sheeting is forced against a heated roll, such as a heated steel roll, by another roll, such as a rubber embossing or a flexo printing roll, containing the design of the image. The pressure and temperature as well as the speed of the roll affect the flattening of the crowns of the reflective layer. The pressure is typically from about 5 to about 75, or from about 10 to about 35, or from about 15 to about 25 pounds per linear inch (pli). The temperature of the heated roll is from about 85 to about 130, or from about 90 to about 120, or from about 95 to about 110 degrees C. The speed of the roll is typically from about 5 to about 100, or from about 8 to about 80, or from about 10 to about 60 ft/min. In one embodiment, the mechanical stops on the embossing and flexographic printing equipment are set to control the depth of the impression of the image. The mechanical stops are set so that the roll with the image design is not forced onto the heated roll when between the raised image designs. The roll with the image design then just touches or kisses the surface of the retroreflective sheeting, thus forming the image.

Figure 4:
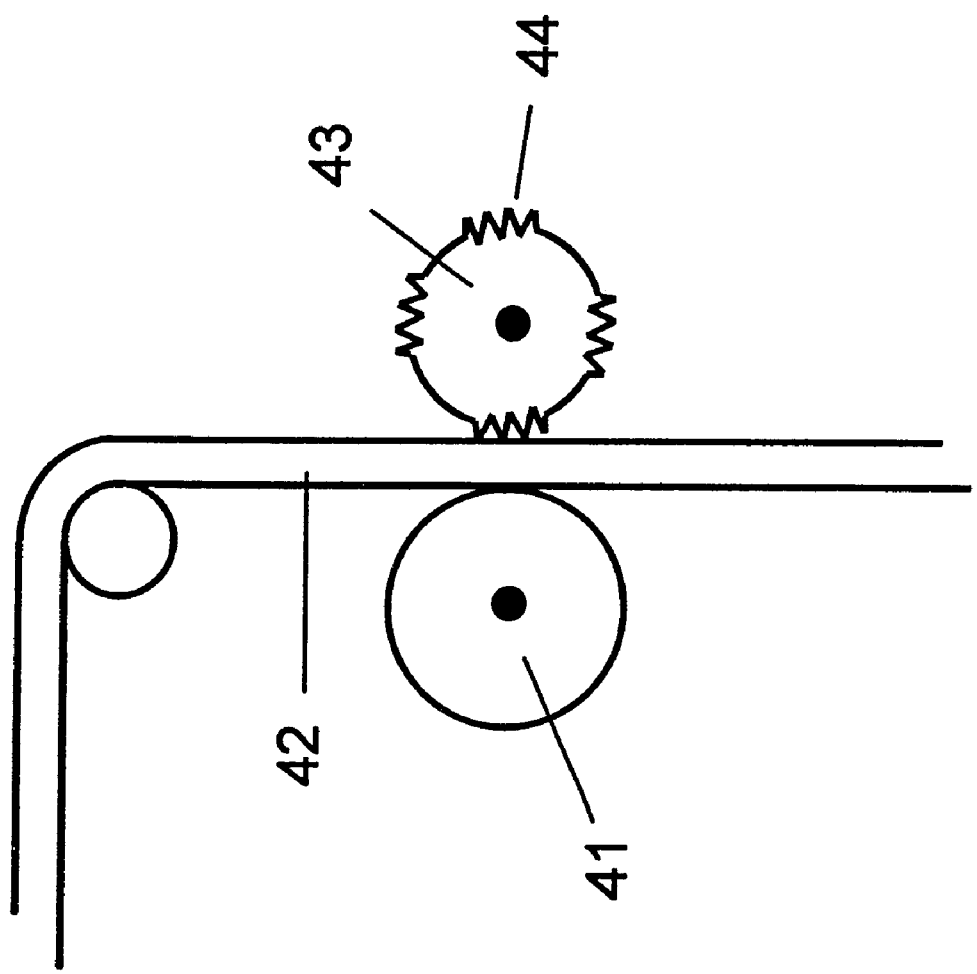
FIG. 4 is an illustration of the method of imparting the image.
Figure 6B:
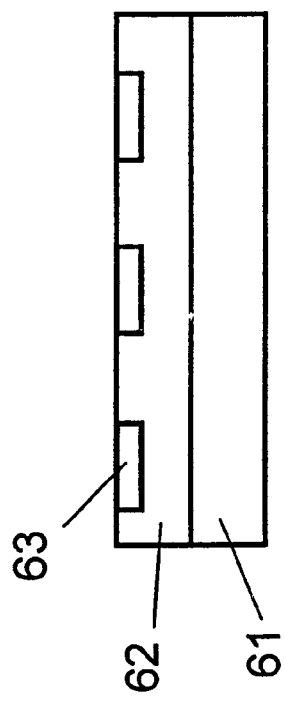
FIG. 6 is an illustration of an another alternative method of imparting the image.
Figure 6A:
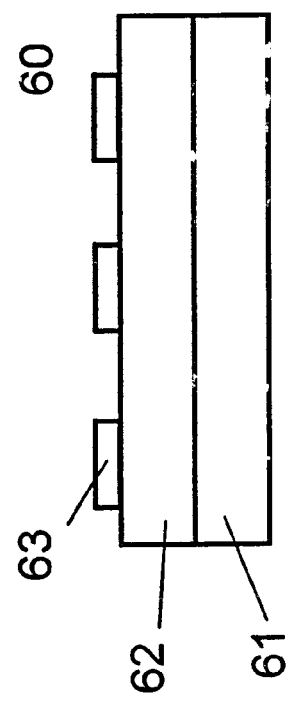
Figure 6D:
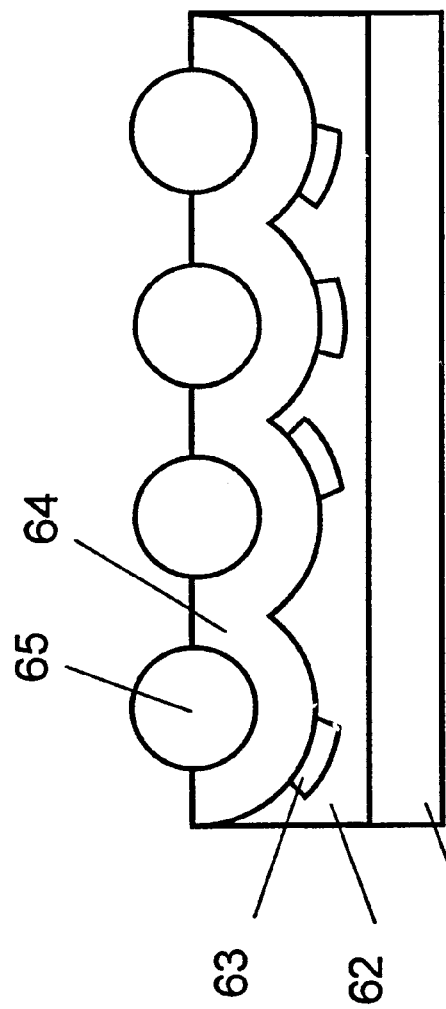
Figure 6C:
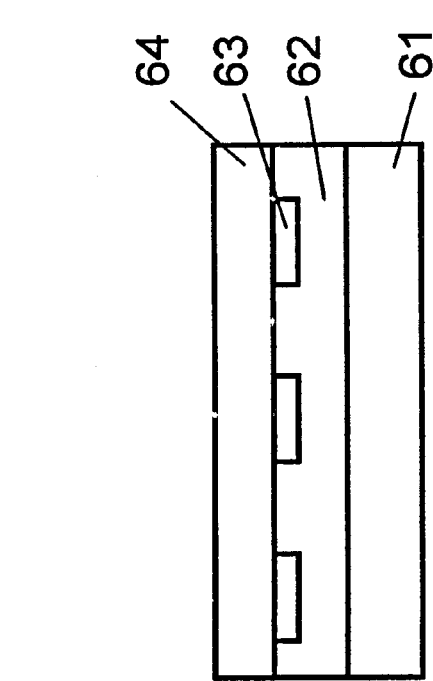

FIG. 4 illustrates the method of imparting the image. Heated steel roll 41 contacts the reflective side of retroreflective sheeting 42. The topcoat side of sheeting 42 is pressed against flexographic roll 43 bearing the raised impression 44 of the desired image. After being subjected to the heating and pressing step, the sheeting 42 has images.

The roll used for the image design may be any roll used for embossing or flexo printing. The advantage of the present process is that the relatively inexpensive equipment may be used for preparing the retroreflective sheeting with the image. With the use of the heated roll the present process provides a simple means to prepare a retroreflective sheeting with an image.

An alternative method of imparting an image can be made by first embossing an image into the face of the polymer coated surface of a casting sheet. This can easily be done into thermoplastic materials using the techniques for embossing holographic images. For example, the sheeting of the invention can be prepared by first extruding or casting a space coat layer of desired thickness on an imaged polymer coated casting sheet and drying if necessary. The space coat layer is reheated to provide a tacky surface upon which microspheres are cascade-coated to form a monolayer of the microspheres. Typically, heat and/or pressure can be applied at this stage to facilitate microsphere embedding. The microspheres generally are embedded into the layer to a depth of about one-half of the average diameter of the microspheres. It is important that the space coat adapts a contour parallel to the microsphere surface and that the image substantially remains intact. The topcoat is then applied over the top of the exposed and partially embedded microspheres.

The topcoating is applied by standard coating methods as described above. Extrusion can be considered as an alternate method of forming a topcoat if required, the topcoat is then subjected to an elevated temperature to dry and/or cure the mixture.

The polymer coated casting sheet then is stripped from the imaged space coat layer, and a reflective layer is subsequently applied over the back surface of the space coat as described above. The topcoat layer then can be printed as described above.

FIG. 5 illustrates an alternative method of imparting the image. In FIG. 5a, article 50 has a substrate 51 which is adhered to polymer film (e.g. polyethylene) 52. Heat and pressure are used to emboss an image 53, such as a holographic image into the surface of a polymer film 52. In FIG. 5b, spacecoat (e.g. polyvinylbutyral) 54 is coated on to polymer film 52. The image 53 in polymer 52 is replicated in the bottom surface of spacecoat 54. In FIG. 5c, glass microspheres 55 are embedded into spacecoat 54, the spacecoat is molded by the polymer layer 52 to a contour parallel to the microsphere surface and the image substantially remains intact. In FIG. 5d, a topcoat 56 is coated on the exposed surface of the glass microspheres 55. In FIG. 5e, the substrate 51 and polymer film 52 are removed from the construction. The spacecoat 54 with holographic images 53 is metallized as described above to form a reflective layer 57.

Another alternative method of imparting an image can be made by first printing an image using a transparent polymer or a transparently colored polymer onto the face of the polymer coated surface of a casting sheet. The printing can be done using common printing techniques such as Flexography (flexo) and Rotogravure (gravure). Heat and pressure are used to press the image into the face of the polymer coated substrate so that the top of the print is substantially level with the polymer coated surface. For example, the sheeting of the invention can be prepared by first extruding or casting a space coat layer of desired thickness on an imaged polymer coated casting sheet and drying if necessary. The space coat layer is reheated to provide a tacky surface upon which microspheres are cascade-coated to form a monolayer of the microspheres. Typically, heat and/or pressure can be applied at this stage to facilitate microsphere embedding. The microspheres generally are embedded into the layer to a depth of about one-half of the average diameter of the microspheres. It is important that the space coat adapts a contour parallel to the microsphere surface and that the image substantially remains intact. The topcoat is then applied over the top of the exposed and partially embedded microspheres.

The topcoating is applied by standard coating methods as described above. Extrusion can be considered as an alternate method of forming a topcoat. If required, the topcoat and the base coat layer are then subjected to an elevated temperature to dry or cure.

The polymer coated casting sheet then is stripped from the imaged space coat layer, and a reflective layer is subsequently applied over the back surface of the space coat as described above. The printed image is non-conforming with the microspheres. The topcoat layer then can be printed (e.g. with UV radiation curable inks) to provide monocolor or multicolor images.

FIG. 6 illustrates an alternative method of imparting the image. In FIG. 6a, article 60 has a substrate (e.g. paper) 61 which is adhered to polymer film (e.g. polyethylene) 62. An image is printed using a transparent or transparently colored polymer (e.g. polyvinylbutyral) on the surface of polymer 62. In FIG. 6b, the image 63 is embedded into polymer layer 62 using heat and pressure. In FIG. 6c, spacecoat (e.g. polyvinylbutyral) 64 is coated onto the surface of polymer film 62 containing embedded images 63. In FIG. 6d, glass microspheres 65 are embedded into spacecoat 64, the spacecoat is molded by the polymer layer 62 to a contour parallel to the microsphere surface and the image substantially remains intact. In FIG. 6e, a topcoat (e.g. aliphatic polyurethane) 66 is coated on the exposed surface of the glass microspheres 65. In FIG. 6f, the substrate 61 and polymer film 62 are removed from the construction. The spacecoat 64 with images 63 is metallized as described above to form a reflective layer 67.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A retroreflective sheet with an image comprising a layer of transparent microsphere lenses, a transparent polymeric spacing layer contacting and conforming to the bottom of the lenses wherein the spacing layer has at least one portion which is non-conforming to the lenses, a reflective layer having a top surface in contact with the back surface of the spacing layer and a topcoat and/or cover sheet overlying and conforming to the top surfaces of the lenses and having a flat top surface or face wherein the non-conforming portion of the spacing layer forms the image.

2. The retroreflective sheet of claim 1 wherein the microspheres have an average refractive index in the range of about 1.8 to about 2.5.

3. The retroreflective sheeting of claim 1 wherein the microspheres are glass microspheres with a average diameters in a range of from about 25 to about 300 microns.

4. The retroreflective sheet of claim 1 wherein the spacing layer is an acrylic polymer, a polyvinyl butyral, an aliphatic urethane and a polyester.

5. The retroreflective sheet of claim 1 wherein the spacing layer is polyvinylbutyral.

6. The retroreflective sheet of claim 1 wherein the thickness of the polymeric spacing layer is from about 25% to about 100% the average diameter of the microsphere lenses.

7. The retroreflective sheet of claim 1 wherein the topcoat has a thickness from about 25 microns to about 300 microns.

8. The retroreflective sheet of claim 1 wherein the topcoat is derived from at least one acrylic polymer, a vinyl polymer, or polyurethanes.

9. The retroreflective sheet of claim 1 wherein the sheet includes a topcoat and a cover sheet.

10. The retroreflective sheet of claim 9 wherein the topcoat is a pressure sensitive adhesive and the cover sheet is derived from at least one acrylic polymer, a vinyl polymer, or polyurethanes.

11. The retroreflective sheet of claim 9 wherein the topcoat is a partially cured urethane and the cover sheet is derived from at least one acrylic polymer, a vinyl polymer, or polyurethanes.

12. The retroreflective sheet of claim 9 wherein the topcoat is a heat activated adhesive and the cover sheet is derived from at least one acrylic polymer, a vinyl polymer, or polyurethanes.

13. The retroreflective sheet of claim 1 further comprising a pressure sensitive adhesive underlying and in contact with the reflective layer.

14. A retroreflective sheet with an image comprising a monolayer of transparent glass microsphere lenses, a polyvinylbutyral transparent polymeric spacing layer contacting and conforming to the bottom of the lenses, a reflective layer having a top surface in contact with the back surface of the spacing layer and a polyurethane topcoat and/or cover sheet overlying and conforming to the top surfaces of the lenses and having a flat top surface or face wherein the image is a non-conforming portion of the spacing layer and the reflective layer.

15. The retroreflective sheet of claim 14 wherein the microspheres have an average refractive index in the range of about 2.0 to about 2.3.

16. The retroreflective sheeting of claim 14 wherein the microspheres are glass microspheres with a average diameters in a range of from about 30 to about 120 microns.

17. The retroreflective sheet of claim 14 wherein the coating thickness of the polymeric spacing layer or space coat is from about 35% to about 75% of the average diameter of the microsphere lenses.

18. The retroreflective sheet of claim 14 wherein the topcoat has a thickness from about 25 microns to about 125 microns.

19. The retroreflective sheet of claim 14 further comprising a pressure sensitive adhesive underlying and in contact with the reflective layer.

* * * * *